D. HYDE.
Churn.
No. 69,998.  Patented Oct. 22, 1867.
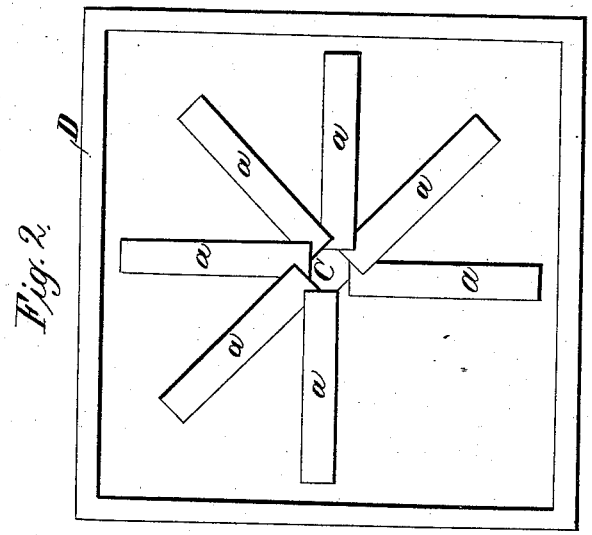
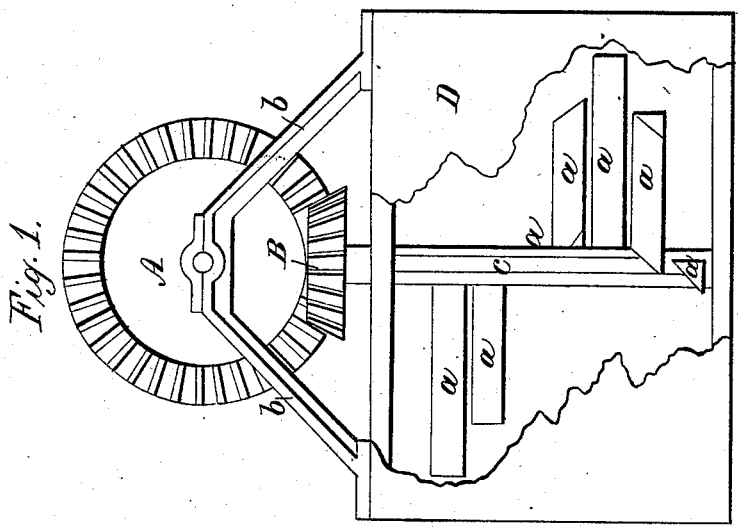
Witnesses
Austin P. Briggs
Garret Vonwagner
Inventor
Dwight Hyde

United States Patent Office.

DWIGHT HYDE, OF BRIDGEPORT, NEW YORK.

Letters Patent No. 69,998, dated October 22, 1867.

IMPROVEMENT IN CHURNS.

The Schedule referred to in these Letters Patent and making part of the same.

Be it known that I, DWIGHT HYDE, of Bridgeport, in the county of Madison, and State of New York, have invented a new and useful Improvement on a Churn for making butter; and I do hereby declare that the following is a full, clear, and exact description of the construction and operation of the same, reference being had to the annexed drawings, making a part of this specification, in which—

Figure 1 is a perspective view.

Figure 2 a longitudinal elevation.

Fig. 1. Letter A represents drive-wheel; B, gear-wheel on top dasher C; b b, bent that supports drive-wheel A; C, standard of dasher; A, the knives in dasher C; D, body of churn. Fig. 2. D, bottom of churn; C, bottom end of dasher; a, bottom side of knives.

The churns are to be constructed in a square or round form; dasher eight-square; the knives square on back and bottom sides, bevelled from back upper corner to front lower edge, so as to make them sharp on front edge; first knife to be fastened to a square side of the dasher at bottom of the churn; the next knife on the next square back of first one, and just high enough to clear the first knife, and in the same order up around the dasher to top of churn; bottom end of dasher to rim on spindle in the bottom of churn, so that pressure of cream running over knives cannot make heavy draught.

What I claim as my invention, and desire to secure by Letters Patent, is—

1. The dashers a, bevelled as shown, and arranged on a vertical octagonal shaft in a spiral ring, one dasher on each side of shaft, substantially as and for the purpose specified.

2. The combination of the driving-wheel A, gear-wheel B, bent b b, body D, with the shaft c and dashers a, when said shaft and dashers are constructed and arranged as set forth and described for the purpose stated.

DWIGHT HYDE.

Witnesses:
AUSTIN P. BRIGGS,
GARRET VANWAGNER.